United States Patent
Fiesoli et al.

(10) Patent No.: US 7,630,185 B2
(45) Date of Patent: Dec. 8, 2009

(54) ELECTRONIC CIRCUIT BREAKER

(75) Inventors: Guido Fiesoli, Arezzo (IT); Francesco Bittoni, Arezzo (IT); Lorenzo Cincinelli, Arezzo (IT)

(73) Assignee: Power-One, Inc., Camarillo, CA (US)

( * ) Notice: Subject to any disclaimer, the term of this patent is extended or adjusted under 35 U.S.C. 154(b) by 45 days.

(21) Appl. No.: 11/226,477

(22) Filed: Sep. 14, 2005

(65) Prior Publication Data
US 2006/0120000 A1 Jun. 8, 2006

Related U.S. Application Data

(63) Continuation-in-part of application No. PCT/IT03/00155, filed on Mar. 14, 2003.

(51) Int. Cl.
H02H 9/08 (2006.01)
(52) U.S. Cl. .................................. 361/93.1; 361/93.9
(58) Field of Classification Search ............... 361/93.1, 361/93.2, 93.7–93.9, 62, 13, 101
See application file for complete search history.

(56) References Cited

U.S. PATENT DOCUMENTS

| | | | |
|---|---|---|---|
| 4,347,474 A | 8/1982 | Brooks et al. ................ 323/224 |
| 4,636,907 A | 1/1987 | Howell ........................... 361/13 |
| 4,647,837 A | 3/1987 | Stemmler .................... 323/207 |
| 4,685,024 A | 8/1987 | Martellock et al. | |
| 4,841,219 A | 6/1989 | Lonergan | |
| 4,853,820 A | 8/1989 | Ham, Jr. et al. | |
| 4,943,761 A | 7/1990 | Fox et al. | |
| 4,979,068 A | 12/1990 | Sobhani et al. ................ 361/18 |
| 5,164,872 A * | 11/1992 | Howell ........................... 361/3 |
| 5,191,278 A | 3/1993 | Carpenter | |
| 5,283,726 A | 2/1994 | Wilkerson .................... 363/41 |
| 5,305,174 A | 4/1994 | Morita et al. | |
| 5,440,441 A | 8/1995 | Ahuja | |
| 5,444,359 A | 8/1995 | Riggio ........................ 323/237 |
| 5,581,433 A | 12/1996 | Jordan | |
| 5,627,415 A * | 5/1997 | Charpentier et al. ......... 307/116 |
| 5,723,915 A * | 3/1998 | Maher et al. ................. 307/131 |

(Continued)

FOREIGN PATENT DOCUMENTS

CH 679704 3/1992

(Continued)

OTHER PUBLICATIONS

Notice of Opposition Papers Filed Jan. 24, 2007 in European Patent Office by Ellenberger & Poensgen Gmbh.

(Continued)

*Primary Examiner*—Danny Nguyen
(74) *Attorney, Agent, or Firm*—Waddey & Patterson; Mark J. Patterson; Gary L. Montle

(57) ABSTRACT

An electronic circuit breaker includes an input for connection to a power-supply and an output for connection to a load. Connected in circuit between the input and the output are a switch, a relay, and a limitation block, which controls the switch to cause at least partial inhibition thereof in the event of an over-current condition. Also provided is a microprocessor which is connected to the limitation block to inhibit power supply to the load.

33 Claims, 6 Drawing Sheets

U.S. PATENT DOCUMENTS

| | | | |
|---|---|---|---|
| 5,892,647 A * | 4/1999 | Mizoe | 361/101 |
| 5,894,394 A | 4/1999 | Baba et al. | |
| 5,926,010 A | 7/1999 | Hosokawa et al. | |
| 6,052,268 A * | 4/2000 | Thomas | 361/103 |
| 6,268,991 B1 * | 7/2001 | Criniti et al. | 361/93.3 |
| 6,490,141 B2 * | 12/2002 | Fischer et al. | 361/66 |
| 6,590,757 B2 * | 7/2003 | Pahl et al. | 361/93.2 |
| 7,230,813 B1 * | 6/2007 | Canova et al. | 361/93.1 |
| 7,368,898 B2 * | 5/2008 | Sutardja et al. | 323/285 |
| 2001/0017485 A1 * | 8/2001 | Yoo | 307/66 |
| 2003/0202304 A1 * | 10/2003 | Canova et al. | 361/93.1 |
| 2005/0078024 A1 | 4/2005 | Harrington | |

FOREIGN PATENT DOCUMENTS

| | | |
|---|---|---|
| DE | 3842921 | 11/1992 |
| EP | 1150410 | 10/2001 |
| EP | 0985987 | 11/2005 |
| WO | IT00/0021 | 1/1997 |
| WO | 00/74196 | 12/2000 |
| WO | WO 2004/082091 A1 | 9/2004 |

OTHER PUBLICATIONS

Applicant's Response to Notice of Opposition Papers filed by Ing. A. Mannucci s.r.l. on Sep. 14, 2007.

Article, "Circuit Breaker Has Programmable Delay," Electrical Design News, 42 Jan. 16, 1997, No. 2, Newton, MA.

\* cited by examiner

ELECTRONIC CIRCUIT BREAKER

CROSS-REFERENCES TO RELATED APPLICATIONS

This application is a Continuation-In-Part application which claims benefit of co-pending U.S. Patent Application Serial No. PCT/IT2003/000155 filed Mar. 14, 2003, entitled "Electronic Circuit Breaker"; U.S. patent application Ser. No. 10/246,513 filed Sep. 18, 2002, entitled "Electronic Circuit Breaker", and U.S. patent application Ser. No. 11/055,531 filed Feb. 10, 2005, entitled "Electronic Circuit Breaker", all of which are hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an electronic circuit breaker for interrupting an electric power supply to a load when the current exceeds a pre-set value, for instance in the case of a short circuit.

There currently exist various types of circuit breakers for protecting circuits from over-currents. Some of these circuit breakers are of a thermal type and are based on the use of bimetallic strips, the deformation of which, on account of the dissipation of heat by the Joule effect due to the passage of current, causes opening of the circuit by a switch. In other circuit breakers, those of the electromagnetic type, interruption is caused by the movement of an armature under the effect of a magnetic field generated by a coil traversed by the current. In either case, an excessive current flowing through the strip (in the case of a thermal circuit breaker) or through the coil (in the case of a magnetic circuit breaker) causes tripping of the circuit breaker.

Thermal circuit breakers present the drawback of having a high tripping time and of being considerably unreliable because of the effect that ambient-temperature variations can have on their operation even when appropriate measures are taken to offset the effect of these variations.

Magnetic circuit breakers can be built in such a way that they trip very fast, this being necessary for protecting present-day circuits that comprise solid-state components. However, their tripping speed is not altogether satisfactory. In addition, their reliability is low in that they feel the effects of external ambient conditions, such as variations in temperature, mechanical vibrations, magnetic interference, etc. In addition, the presence of a mobile armature sets limits to the freedom of choice of the position in which these circuit breakers can be installed, on account of the influence that the force of gravity may have on the tripping characteristics of these devices.

There also exist electronic circuit breakers, for example of the type described in U.S. Pat. No. 4,979,068. Also these circuit breakers are not altogether satisfactory.

BRIEF SUMMARY OF THE INVENTION

A purpose of the present invention is to provide an electronic circuit breaker which overcomes the drawbacks presented by conventional circuit breakers.

In particular, a purpose of the present invention is to provide a reliable electronic circuit breaker that has characteristics of high durability and very short tripping times, presents a galvanic insulation between the input and the output when it is in the opening condition, and enables limitation of peak current.

A further purpose of the present invention is to provide a circuit breaker device that can be programmed.

These and further purposes and advantages, which will emerge clearly to a person skilled in the art from the ensuing text, are basically obtained with an electronic circuit breaker having, between the input and the output of the circuit breaker, at least one switch and one limitation block which controls the switch to cause at least partial inhibition in the event of over-current, and at least one isolation device, for example a relay, inserted in series with the switch, which provides galvanic insulation of the input and the output when the switch is in the opening condition; and a microprocessor connected to the limitation block to cut off the power supply to the load connected to the circuit breaker.

In this way, an over-current causes tripping of the limitation block and at least partial opening of the circuit by the switch, for example a MOSFET. The tripping time is extremely short, i.e., of the order of hundreds of microseconds. Within a delay time that may be advantageously programmed by the microprocessor, the latter sends the circuit breaker into a state of inhibition and cuts off supply to the load. The circuit breaker can now be reset, once the cause of its tripping has been determined, by means of the reset signal of the microprocessor or via remote control.

The use of a microprocessor enables a plurality of functions and advantages to be achieved. In particular, the delay in intervention of the switch, which brings about complete inhibition or interruption of the circuit breaker (the so-called "tripping"), and the value of the current that causes opening of the circuit by the circuit breaker, are programmable and may possibly be modified also remotely by means of an input/output terminal of the microprocessor and a serial port. The operating parameters of the circuit breaker (voltage across the terminals and current) can be stored and then read whenever necessary by means of the same input/output terminal and the same serial port that enables programming. The circuit breaker can be remotely controlled.

The relay arranged in series with the switch has the function of obtaining galvanic insulation between the input and the output when the switch is inhibited.

The relay for galvanic insulation is controlled in such a way that the contacts of the relay are always opened or closed in the absence of an applied voltage so as to prevent possible electric arcs which could be created and at the same time lengthen the life of the device. For this purpose, for instance during closing of the circuit by the electronic circuit breaker, after the supply voltage has been applied, the relay closes its contacts an instant before the microprocessor brings the switch into conduction. Because the switch and the relay are set between the input and the output in series with respect to one another, the contacts of the relay switch at zero voltage.

In the event of a short circuit and tripping of the electronic circuit breaker, operation is as described in what follows. Prior to opening of the circuit by the breaker, the switch is conducting and the contacts of the relay are closed. The input voltage is applied to the load. When a short-circuit condition occurs and the circuit breaker has to open the circuit, the switch is inhibited, and the relay opens an instant of time after saturation of the switch, i.e., also in this case, in the absence of voltage across its contacts.

The circuit breaker according to the invention presents numerous advantages as compared to circuit breakers of the prior art. The circuit breaker of the present invention is more reliable, with a higher MTBF, because a relay that switches in the absence of a voltage across its contacts has a longer life. The current is limited in extremely short time intervals, even during the tripping time, i.e., the time interval up to complete opening of the circuit. The programmability of the device renders it extremely versatile. Furthermore, as will be clarified in what follows, by using a microprocessor it is possible to provide various functions without any need for auxiliary components. In particular, it is possible to detect the input voltage of the circuit breaker and program opening of the circuit by means of the microprocessor when the voltage oversteps a given value, which is programmable. This renders superfluous the use of other electromechanical devices that are sensitive to over-voltages. The current that flows through the circuit breaker can be determined by the microprocessor itself and communicated externally, thereby eliminating the need for separate current sensors.

Further advantageous features and embodiments of the invention are specified in the attached dependent claims.

A better understanding of the invention will be provided by the ensuing description and the attached drawing, which illustrates a possible, non-limiting, embodiment of the invention. In the drawings:

DETAILED DESCRIPTION OF THE INVENTION

Figure 1:
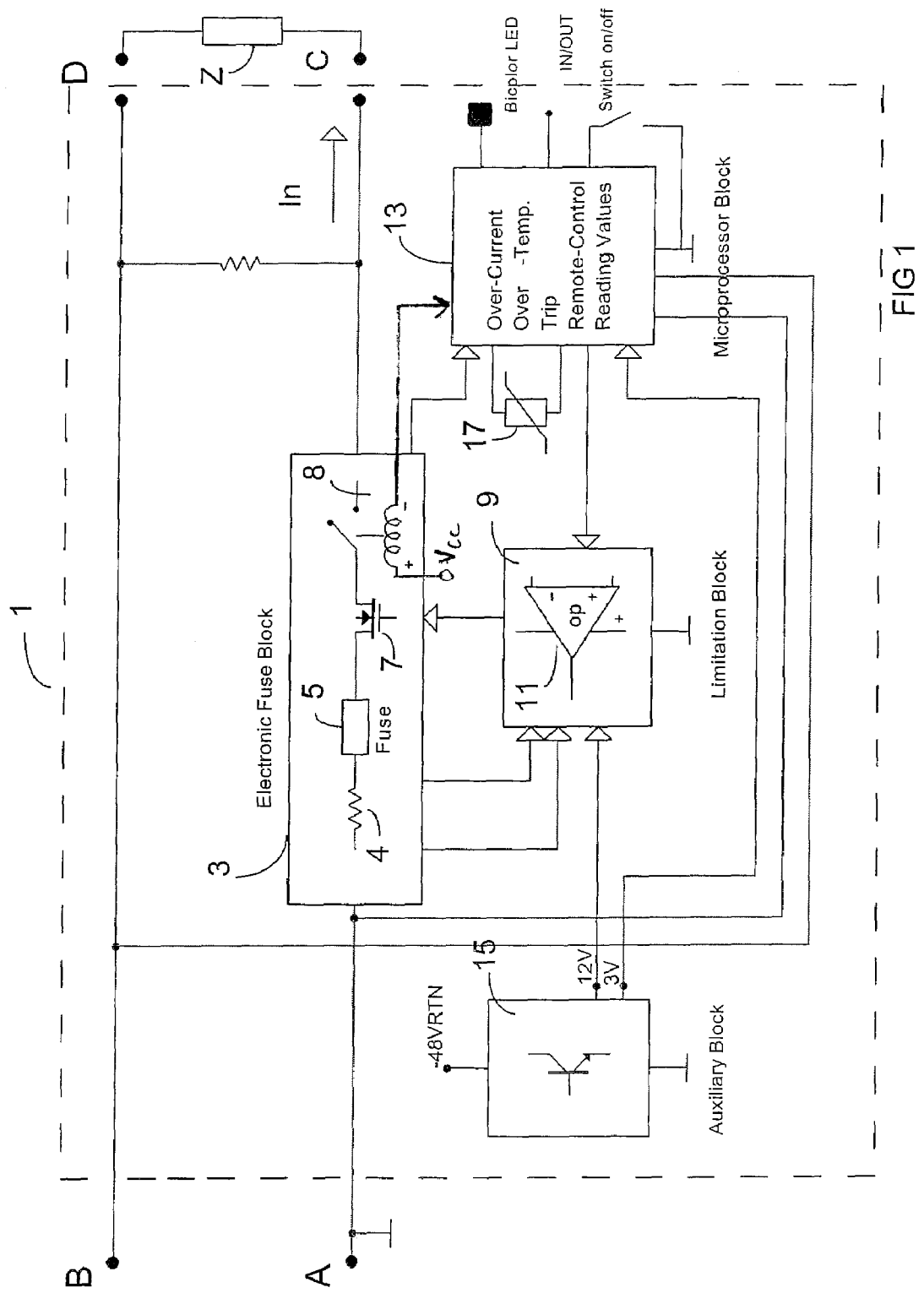
FIG. 1 is a block diagram of the circuit breaker according to the present invention.

With reference initially to the diagram in FIG. 1, the circuit breaker 1 has an input having two terminals, A and B, and an output having two terminals, C and D. In circuit with line A-C is an interrupt block 3, which contains a current-sensing resistor 4, by means of which the current that traverses the circuit breaker 1 and that supplies a load circuit, or load, which is connected between the output terminals C and D, is read. The interrupt block 3 also includes at least one fuse 5, an electronic switch 7, and a relay 8. The fuse 5 constitutes a so-called "catastrophic protection". The fuse 5 opens to definitively interrupt current flow, for example, in the event of a short circuit. In this case, the circuit breaker 1 must be replaced, or at least the fuse 5 must be replaced, whereas in other tripping situations, as will be clarified below, it is sufficient to reset the circuit breaker 1 that has tripped on account of an over-current condition. Similar to the fuse 5, the relay 8 functions as an isolation device to completely interrupt current to the load and to electrically isolate the input from the output under conditions where an over-current condition is maintained for an extended period. The interrupt block 3 also includes an electronic switch 7, for example a MOSFET, to provide protection against transient over-currents, and opens the circuit in the way described below.

The reference number 9 designates a limitation block, which comprises an operational amplifier 11 and is connected both to the interrupt block 3 and to a microprocessor 13. The limitation block 9 and the microprocessor 13 are supplied by an auxiliary voltage source 15.

In addition to being connected to the limitation block 9, the microprocessor 13 is also connected to the interrupt block 3 and to a resistor 17 having a resistance that can vary with temperature, for example a PTC or an NTC resistor, which is thermally coupled to the components of the circuit breaker 1 that are subject to overheating.

Operation of the circuit breaker 1 as outlined above is described in what follows. In conditions of normal supply to the load Z (when connected to terminals C, D), a load current $I_N$ is supplied. The fuse 5 is intact, and the switch 7 and the relay 8 are fully conducting.

In the case of a catastrophic event, such as a short circuit, the fuse 5 causes the circuit breaker 1 to open the circuit instantaneously and irreversibly, and power supply to the load Z is thus interrupted.

In the event of over-current to the load Z, i.e., in the event of the current exceeding a pre-set limit value $I_{limit}$, the limitation block 9, by means of the operational amplifier 11, sends the switch 7 of the interrupt block 3 into a condition of partial inhibition. The time required for this inhibition to occur is very short, i.e., in the region of 300 microseconds or less. The current that is now flowing through the circuit breaker 1 is kept below the value $I_{limit}$ for a delay time that can be programmed by means of the microprocessor 13. Once this delay time interval has elapsed, the microprocessor 13 causes complete inhibition of the switch 7 and, after a few instants, opening of the contacts of the relay, so bringing the current to the load Z to a zero value. Opening of the contacts of the relay 8 thus occurs substantially at zero voltage.

Figure 3:
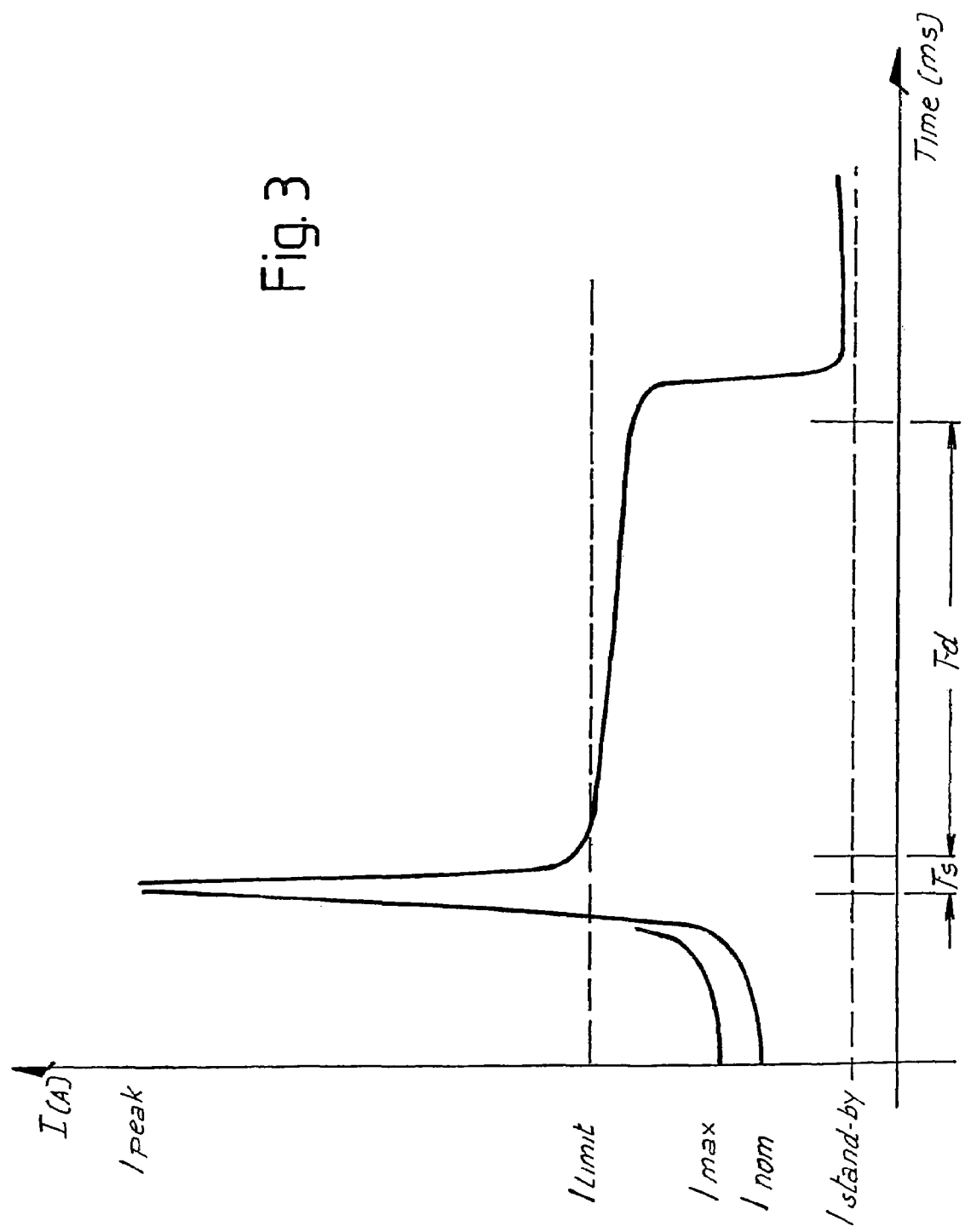
FIG. 3 graphically illustrates the current-time characteristics of a circuit breaker operating in accordance with the present invention.

FIG. 3 shows the tripping characteristic of the circuit breaker 1 in these conditions. The time appears on the abscissa, and the current values appear on the ordinate, as indicated above. The graph shows the plots of the nominal or rated current $I_{nom}$ and the maximum current $I_{max}$ for which the circuit breaker 1 is designed. The peak-current value is designated by $I_{peak}$, this value being reached in a very short time interval Ts, i.e., the time needed for the limitation block 9 to go into action. The delay time between intervention of the limitation block 9 and intervention of the microprocessor 13 (tripping) is designated by Td.

The resistor 17, which is variable according to temperature, constitutes a temperature sensor for the microprocessor 13. The temperature sensor enables interruption of power supply in the event of overheating, by means of appropriate programming of the microprocessor 13 itself.

Because the microprocessor 13 is connected to the interrupt block 3, it can determine, by means of the current-read resistor 4, the current instantaneously flowing through the circuit breaker 1. A connection between microprocessor 13 and the terminals A and B enables the instantaneous input voltage to be read, and enables opening of the circuit, which is controlled by the microprocessor itself, in the event of over-voltage.

Figure 2:
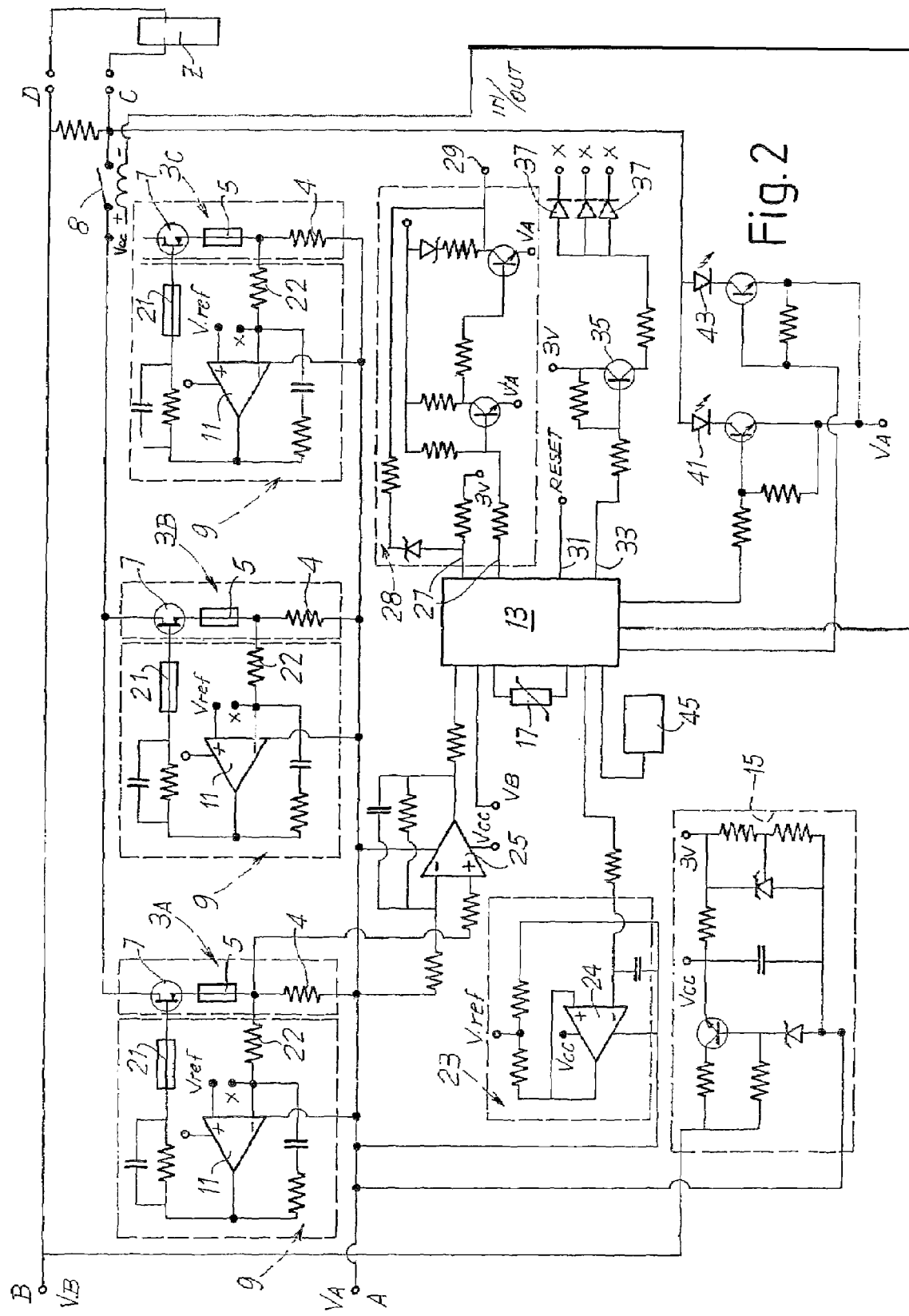
FIG. 2 is a schematic diagram of one embodiment of the invention.

FIG. 2 presents a more detailed diagram of an embodiment of the circuit breaker 1 according to the invention, in which there are shown only the components that are essential for enabling understanding and reproduction of the invention. The same reference numbers designate parts that are the same as or correspond to those appearing in the block diagram of FIG. 1.

The circuit of FIG. 2 comprises three blocks, indicated by 3A, 3B, 3C, which are functionally equivalent to interrupt block 3 of FIG. 1, the blocks being connected in parallel together and being substantially the same as one another. The blocks 3 may vary in number according to the maximum current for which the circuit breaker 1 has been sized. The larger the current for which the circuit breaker is to be sized, the greater the number of blocks 3, 3A, 3B, 3C, . . . , arranged in parallel, each being traversed by a fraction of the total current supplied to the load Z. However, only a single relay 8 is required and it is arranged downstream of the three parallel blocks 3A, 3B, and 3C.

Each interrupt block 3A, 3B, 3C includes an operational amplifier 11, the output of which is connected to the gate terminal of the MOSFET switch 7. The source terminal of the MOSFET switch 7 is connected to terminal A of the circuit breaker 1, whilst the drain terminal is connected to terminal C. The current-read resistors 4 and the fuses 5 are connected in circuit between the source terminal of the MOSFET switch 7 and terminal A of the circuit breaker 1. Connected between the output of the operational amplifier 11 and the gate terminal of the MOSFET switch 7 is a further protection fuse 21, which is connected in series with a parallel RC circuit.

The inverting input of the operational amplifier 11 of each interrupt block 3A, 3B, 3C is connected, by means of a resistor 22, between the current-read resistor 4 and the fuse 5. Applied to the non-inverting terminal of the operational amplifier 11 is a reference voltage $V_{ref}$, which is generated by a circuit 23, which is connected to the microprocessor 13 and is described in greater detail below.

The voltage across the current-read resistor 4 is applied to the inputs of an operational amplifier 25, the output of which is connected to the microprocessor 13, which thus receives a signal that is proportional to the current flowing through the resistor 4. The circuit arrangement described so far is envisaged only for the interrupt block 3A, whereas it is absent in the blocks 3B and 3C. Because the three blocks 3A, 3B, 3C are basically the same, the total current supplied to the load Z is equal to three times the current sensing by the microprocessor 13 by means of the current-read resistor 4 through the amplifier 25.

In the circuit diagram of FIG. 2, two terminals 27 are shown, which are connected, by means of an interface 28, to an input/output terminal 29, which constitutes an external connection to the microprocessor 13. By means of this interface, the microprocessor 13 can be programmed and interrogated, for example to check the operating conditions of the circuit breaker 1. Interrogation and programming can be carried out remotely.

The reference number 31 designates a reset terminal of the microprocessor 13, while 33 designates a terminal via which the microprocessor 13 is connected to the blocks 3A, 3B, 3C. More particularly, the terminal 33 is connected to the inverting input of each operational amplifier 11 of the various blocks 3A, 3B, 3C through a transistor 35 and a corresponding diode 37. Connection between each diode 37 and the corresponding inverting input of the corresponding operational amplifier 11 is represented by the letter X.

Also shown in the diagram of FIG. 2 are two LEDs, 41 and 43, which are connected to corresponding pins of the microprocessor 13 and which enable display of the operating conditions of the circuit breaker 1. A storage block 45 is also connected to the microprocessor 13, in which the information regarding the operating conditions of the circuit breaker 1 is stored, this information being readable by means of the input/output terminal 29.

The circuit 23 comprises an operational amplifier 24, the inverting input of which is connected to the microprocessor 13, and on the output of which there is present the reference voltage $V_{ref}$. The value of reference voltage $V_{ref}$ is programmable by means of the microprocessor 13 according to the characteristics that the circuit breaker 1 is to possess.

FIG. 2 is a schematic representation of the configuration a conventional auxiliary voltage source 15, connected to the two terminals A and B of the circuit breaker 1. The auxiliary voltage source 15 generates two DC voltages, e.g., 12 V and 3 V, at the terminals designated by $V_{cc}$ and 3V. These voltages are used to supply the various circuit components, according to what is illustrated in the diagram of FIG. 2.

In line with what has been briefly described with reference to the block diagram of FIG. 1, the circuit of FIG. 2 operates as described in what follows. In normal operating conditions, current flows through the blocks 3A, 3B, 3C towards the load Z. The MOSFET switches 7 are in full conduction. In the event of an over-current condition, each of the operational amplifiers 11 is activated. The value at which the operational amplifiers 11 go into action is fixed by the reference voltage $V_{ref}$, which is determined by a corresponding programming of the microprocessor 13. The time for intervention of the individual operational amplifiers 11 is very limited (less than 300 microseconds). The operational amplifiers 11 have the effect of reducing the current flowing from terminal A to terminal C towards the load Z. After a programmable delay time, the microprocessor 13 goes into action, by means of the output voltage on the pin 33 sent to the individual amplifiers 11 of the blocks 3A, 3B, 3C, and sends the individual MOSFET switches 7 into a state of inhibition, thus reducing the current to the tripping value $I_{stand-by}$. The microprocessor 13 can act on the blocks 3, causing inhibition of the switches 7 also in the case of overheating, which is detected by the resistor 17, which is temperature-variable. In addition to inhibiting the three MOSFET switches 7, the microprocessor 13 can intervene, with a programmable delay, to open the relay 8 in order to obtain galvanic insulation between the input and the output of the circuit breaker.

According to a further embodiment, the microprocessor 13 can be programmed so that the time delay Td with which the circuit breaker is brought into non-conducting condition (by completely inhibiting MOSFET switch 7) can be made dependent upon the voltage drop across the switch 7 itself. The dependency between time delay Td and the voltage drop across switch 7 is such that the higher the drop voltage across the switch 7, the shorter the delay time Td. This possibility is based on the concept of keeping the MOSFET switch 7 into its so-called SOAR area (Safe Operating ARea), which depends on the voltage applied across the device, the current flowing therethrough, and the power. The microprocessor 13 can thus be programmed such as to set a Td value for each one of a set of possible voltage drop values across the MOSFET switch 7, or it can be programmed such that Td is calculated as a function of the voltage drop, which can be detected according to standard techniques. It is also possible to combine the pre-setting of the Td times by means of pre-programming the microprocessor 13 with a calculation of the value based on the voltage drop. For example, a maximum Td can be set by properly programming the microprocessor 13, and a shorter Td can be selected or set if the voltage drop across switch 7 is higher than a minimum value.

Figure 4:
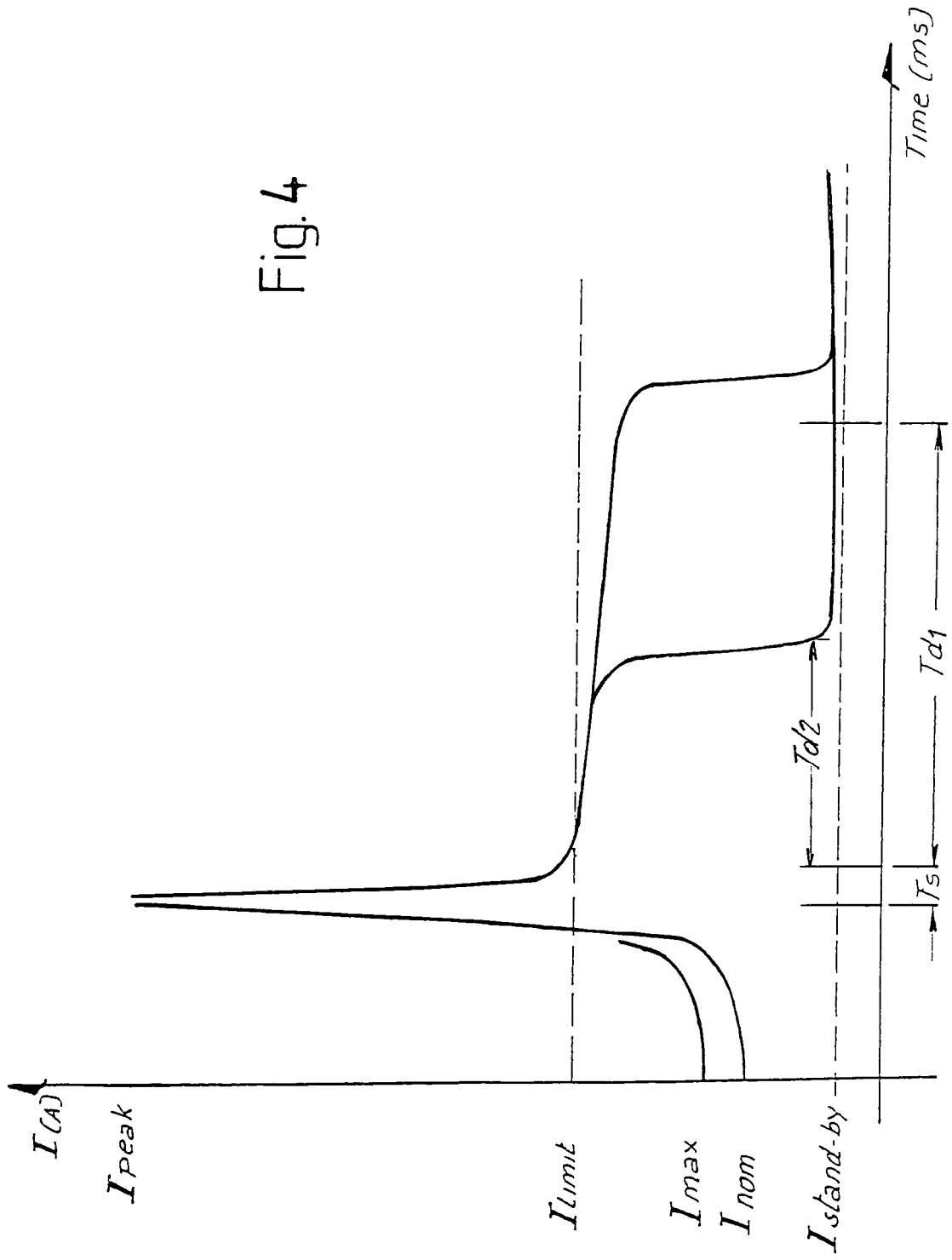
FIG. 4 is a diagram similar to the one in FIG. 3, wherein, however, two different time delays (Td1 and Td2) are provided depending upon the voltage drop across the switch as detected by the microprocessor.
Figure 5:
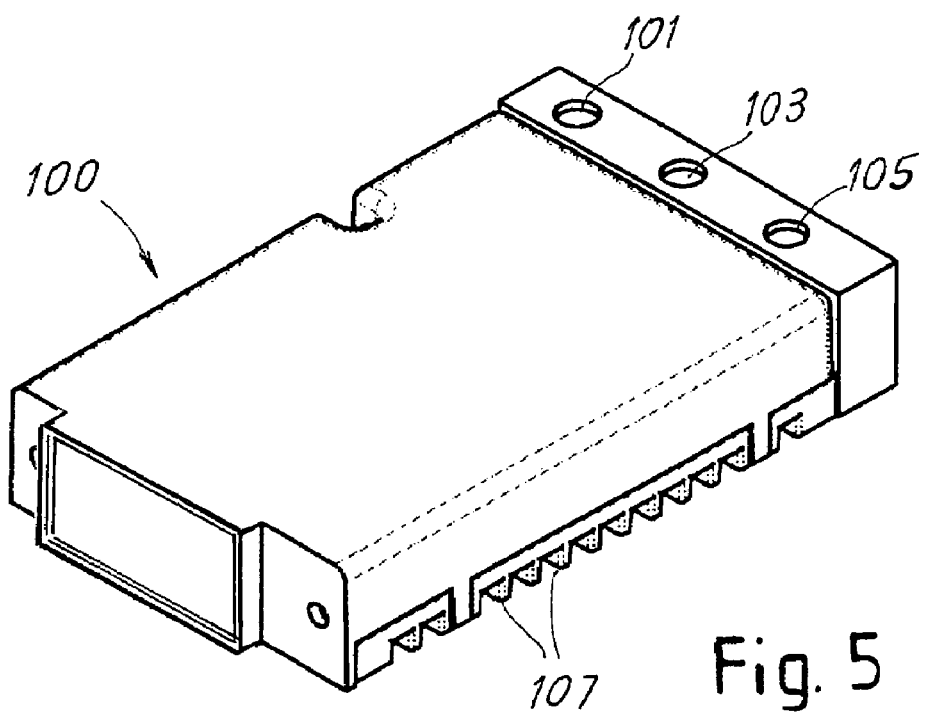
FIG. 5 is a top perspective view of one embodiment of a housing for the circuit breaker of the present invention.
Figure 6:
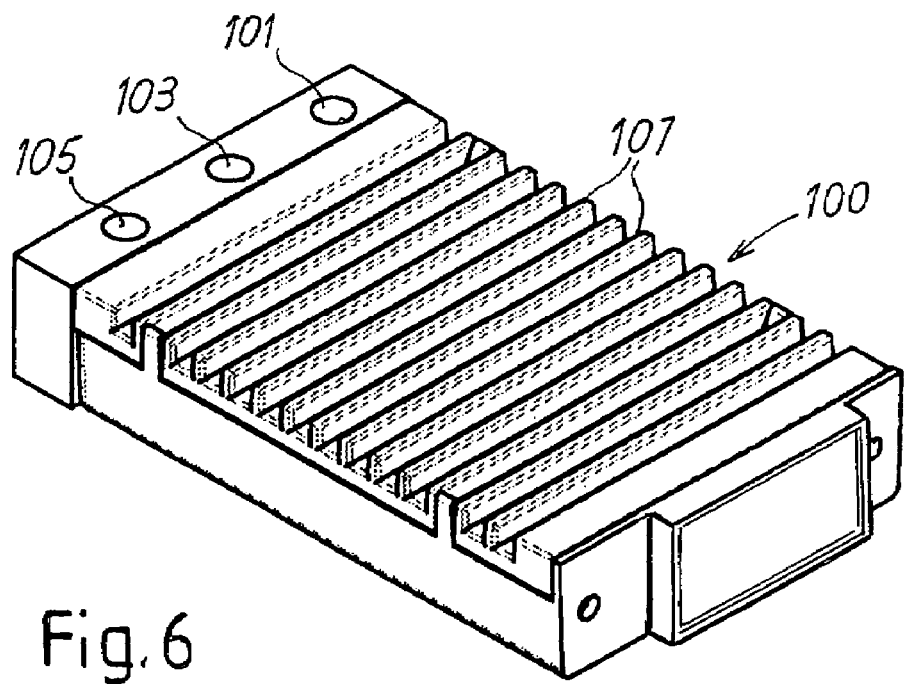
FIG. 6 is a bottom perspective view of the circuit breaker housing of FIG. 5.
Figure 7:
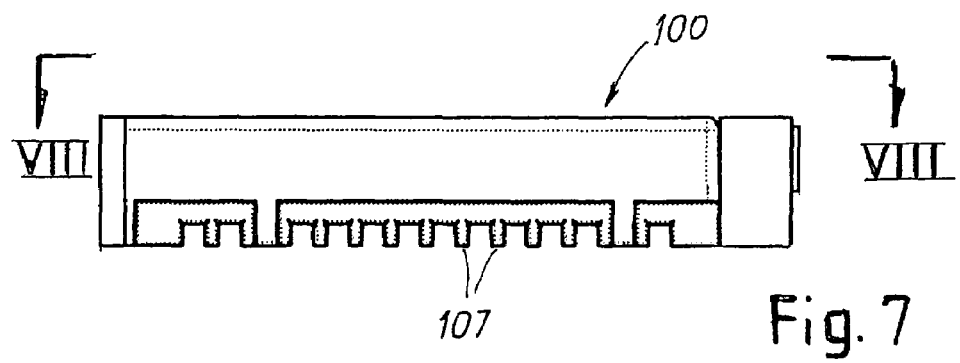
FIG. 7 is a side view of the circuit breaker housing of FIG. 5.
Figure 8:
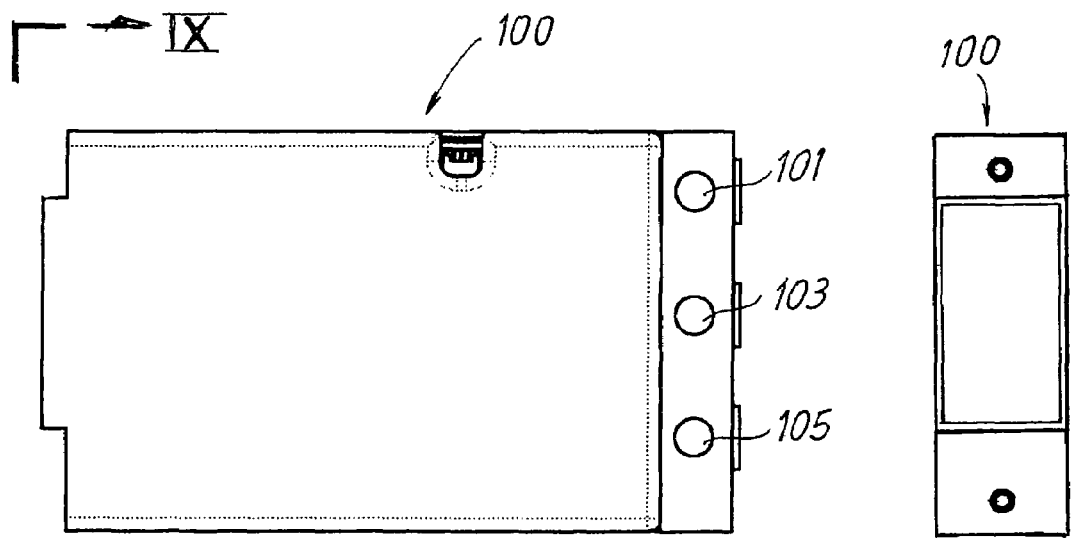
FIG. 8 is a top view of the circuit breaker housing of FIG. 5.
Figure 9:
FIG. 9 is an end view of the circuit breaker housing of FIG. 5

FIG. 4 shows a diagram similar to the one in FIG. 3 in which two different time delays (Td1 and Td2) are provided depending upon the voltage drop detected by the microprocessor across the MOSFET switch 7. The time delay Td2 is shorter than Td1. Time delays Td1 and Td2, therefore, are determined by the microprocessor 13 in conjunction with two different voltage drops across the MOSFET switch 7, the time delay Td2 being calculated and set for a higher voltage drop than the time delay Td1. The voltage drop is detected during operation of the breaker, e.g. after the switch 7 has been partially inhibited by limiting block 9. The microprocessor 13 can be connected to the switch 7 such as to directly detect the voltage drop across the switch, or a voltage drop across a circuit portion including the switch, e.g. across components 4, 5, 7 in blocks 3A, 3B, 3C of FIG. 2, or at least one of these circuit branches. In any event, the microprocessor 13 is able to detect a voltage drop which is variable and is linked to the voltage drop across the actual switch 7, or else one or each of the switches 7 of a circuit breaker having more than one switch 7 as depicted in the example of FIG. 2.

The circuit breaker 1 described so far can be contained in a housing 100 as shown in FIGS. 5-9. The outer dimensions and the position and center distance of the external contacts 101, 103, 105 of the housing 100 can be identical to those typically used in a magnetic circuit breaker. The housing 100 is provided with fins 107 for heat dissipation. This configuration of the housing 100 makes it possible to replace a common magnetic circuit breaker with an electronic circuit breaker according to the invention without changing the circuit to which the breaker is combined.

The use of a MOSFET or a plurality of MOSFETs as electronic switches provides the possibility to arrange several circuit breakers in parallel, since each MOSFET switch 7 is provided with a parallel diode.

The circuit breaker according to the invention can be designed for currents in the range of 40-60 A.

It is understood that the drawing figures illustrate a possible practical exemplification of the invention, which may vary in its embodiments and arrangement without thereby departing from the scope of the invention.

Thus, although there have been described particular embodiments of the present invention of a new and useful electronic circuit breaker, it is not intended that such references be construed as limitations upon the scope of this invention except as set forth in the following claims.

What is claimed is:

1. An electronic circuit breaker with an input for connection to a power-supply and an output for connection to a load, comprising:
   an interrupt block connected in circuit between the input and the output, the interrupt block including at least one switch functional to inhibit current flow from the input to the load and an isolation device functional to interrupt current flow to the load;
   a limitation block electrically coupled to the interrupt block, the limitation block functional to sense a current level of the current flow to the load and to cause the switch to partially inhibit current flow to the load during a delay period when the current level is greater than a threshold current value, the switch partially inhibiting current flow such that the current level of the current flow is maintained below the threshold value during the delay period; and
   a microprocessor operably coupled to the interrupt block and to the isolation device, the microprocessor operable to cause the isolation device to interrupt current to the load after the delay period in which the current has been maintained below a threshold value, wherein the microprocessor is operable to set the length of the delay period.

2. The circuit breaker according to claim 1, wherein said switch is a semiconductor device.

3. The circuit breaker according to claim 1, wherein said isolation device is a relay.

4. The circuit breaker according to claim 1, wherein said microprocessor is programmed for controlling switching of isolation device and of said switch in such a way that switching of the isolation device occurs substantially at zero voltage.

5. The circuit breaker according to claim 2, wherein said microprocessor is programmed for controlling switching of said isolation device and of said switch in such a way that switching of the isolation device occurs substantially at zero voltage.

6. The circuit breaker of claim 5, wherein said limitation block comprises an operational amplifier having an inverting input and a non-inverting input and wherein the limitation block is operable to sense the current level by receiving a signal proportional to the current level that traverses said circuit breaker at the inverting input and a reference voltage is applied to the non-inverting input wherein a relationship between the reference voltage and the current detected by the operation amplifier partially inhibits current flow to the load.

7. The circuit breaker according to claim 6, wherein said reference voltage is programmable by means of said microprocessor.

8. The circuit breaker according to claim 6, wherein said microprocessor is connected to the inverting input of said operational amplifier.

9. The circuit breaker according to claim 6, wherein said switch is connected to an output of said operational amplifier.

10. The circuit breaker according to claim 6, wherein a fuse is connected in circuit between the output of said operational amplifier and said switch.

11. The circuit breaker according to claim 1, comprising at least one catastrophic-protection device in circuit between the input and the output.

12. The circuit breaker according to claim 1, comprising at least one sensing resistor connected in circuit for determining an amount of current that flows through said circuit breaker.

13. The circuit breaker according to claim 1, wherein said at least one catastrophic-protection device is connected in series with said at least one switch.

14. The circuit breaker according to claim 12, wherein said at least one sensing resistor is connected in series with said at least one switch.

15. The circuit breaker according to claim 1, wherein said microprocessor is connected to a temperature sensor and is programmed to cause opening of the circuit in the event of overheating.

16. The circuit breaker according to claim 1, wherein said microprocessor comprises an input/output terminal for programming and/or communication external to said circuit breaker.

17. The circuit breaker according to claim 1, wherein said microprocessor is associated to a memory for storing the parameters for operation of the circuit breaker.

18. The circuit breaker according to claim 1, comprising a plurality of switches, each of which is associated to a corresponding limitation bock, said switches being set in parallel with respect to one another.

19. The circuit breaker according to claim 18, comprising an individual relay associated to said switches, which are arranged in parallel with respect to one another.

20. The circuit breaker according to claim 1, wherein said microprocessor receives an input signal proportional to a voltage associated with the current level of the current flow at the input to the circuit breaker and is programmed to cause opening of the circuit by the circuit breaker when said voltage exceeds a pre-determined value.

21. The circuit breaker according to claim 1, wherein said microprocessor is programmed to cut off power supply to the load by bringing said switch and said isolation device into an open condition after a time delay following partial inhibition of said switch.

22. The circuit breaker according to claim 21, wherein said time delay is programmable.

23. The circuit breaker according to claim 21, wherein said time delay is variable according to a voltage drop across said switch.

24. The circuit breaker according to claim 22, wherein said time delay is variable according to a voltage drop across said switch.

25. The circuit breaker according to claim 21, wherein said microprocessor is arranged to detect a voltage value which is a function of a voltage drop across said switch and wherein said microprocessor is programmed to modify said time delay as a function of said detected voltage value.

26. The circuit breaker according to claim 25, wherein said limitation block comprises an operational amplifier, to a first input of which there is applied a signal proportional to the current level of the current flow that traverses said circuit breaker, and to the second input of which there is applied a reference voltage.

27. The circuit breaker according to claim 26, wherein said reference voltage is programmable by means of said microprocessor.

28. The circuit breaker according to claim 1, wherein said at least one switch includes a MOSFET.

29. A method for controlling a circuit breaker, including the steps of:
arranging at least an electronically controllable switch and an isolation device between an input and an output of said circuit breaker;
providing a microprocessor controlling said switch;
programming a pre-set time delay for a partial inhibition of said switch;
powering a load through said circuit breaker;
detecting a current flowing through said circuit breaker;
when the current exceeds a current threshold, partially inhibiting said switch so that the current is maintained below the current threshold during the delay period; and
following the pre-set time delay for the partial inhibition of said switch, cutting off power supply through said circuit breaker by opening said isolation device.

30. The method according to claim 29, including the steps of providing a limitation block controlling said at least one switch and partially inhibiting said switch by means of said limitation block.

31. The method according to claim 29, further including the steps of:
detecting a voltage drop which is a function of the voltage drop across said at least one switch;
calculating said time delay as a function of said detected voltage drop.

32. The method according to claim 30, further including the steps of:
detecting a voltage drop which is a function of the voltage drop across said at least one switch;
calculating a time delay as a function of said detected voltage drop.

33. The method according to claim 29, further including the step of detecting an input voltage across input terminals of said circuit breaker, cutting off said circuit breaker when said input voltage exceeds a pre-set overvoltage value.

* * * * *